United States Patent
Lewis

[15] 3,703,618
[45] Nov. 21, 1972

[54] VEHICLE SEAT BELT NON-USE WARNING SIGNAL SWITCH MOUNTING

[72] Inventor: Fred I. Lewis, 2810 East Tenth Street, Anderson, Ind. 46012

[22] Filed: March 24, 1971

[21] Appl. No.: 127,580

[52] U.S. Cl. ..............................................200/85 R
[51] Int. Cl. ..............................................H01h 3/14
[58] Field of Search........200/85 R, 85 A; 307/105 B; 340/52 E; 180/825 B

[56] References Cited

UNITED STATES PATENTS 2,708,005   5/1955   Gazzo ....................307/105 B
2,794,089   5/1957   Hogg et al................200/85 R

FOREIGN PATENTS OR APPLICATIONS 1,048,784   1/1959   Germany ................200/85 R
1,386,384   12/1964  France.....................340/278

Primary Examiner—David Smith, Jr.
Attorney—Woodard, Weikart, Emhardt & Naughton

[57] ABSTRACT

A vehicle seat has a switch therein adjustably mounted to respond to application of a selectable minimum seat occupant weight above the switch to close the switch and actuate a seat belt warning circuit, the mounting having compliance and resilience to avoid creation of a lump in the seat as the seat is depressed. One switch mount includes a simple beam type support, while the other is a cantilever beam.

5 Claims, 6 Drawing Figures

PATENTED NOV 21 1972 3,703,618

INVENTOR
FRED I. LEWIS
BY
Woodard, Weikart, Emhardt & Naughton
ATTORNEYS

INVENTOR
FRED I. LEWIS
BY
Woodard, Weikart, Emhardt & Naughton
ATTORNEYS

VEHICLE SEAT BELT NON-USE WARNING SIGNAL SWITCH MOUNTING

BACKGROUND OF THE INVENTION

1. Field of the Invention

This invention relates generally to seat belt alarm systems and more particularly to seat load responsive switch mountings therefor.

2. Description of the Prior Art

In U.S. Pat. No. 3,437,993 issued Apr. 8, 1969 to Orlando Recio et al., a system is provided whereby, unless a seat belt is fastened, at a seat which is occupied, the engine starter cannot be energized. Instead, when the starter switch is closed a lamp is lighted to indicate that the seat belt is unfastened. If the seat is not occupied, the starter can be energized regardless of whether or not the seat belt is fastened. The patent shows several types of switches responsive to seat occupancy to provide this result.

Other patents showing switches responsive to seat occupancy and used in vehicle safety systems including seat belt warning systems are: U.S. Pats. No. 3,005,187 to D. J. Passa, Oct. 17, 196; No. 3,340,523 to R. L. Whitman Sept. 5, 1967; No. 3,455,410 to J. W. Wilson, July 15, 1969; No. 3,504,336 to O. W. Boblitz, Mar. 31, 1970.

It is believed that switches shown in these patents have one or more shortcomings, such as cost, difficulty of installation in the original equipment manufacture and in the after-market, difficulty of accommodation to distinguish between the weight of a passenger and the weight of a package resting on the seat, tendency to create a bulge in the seat, and limited or no adaptability to incorporation in vehicles having six-way adjustable power seats. The object of the present invention is to overcome one or more of these shortcomings of the prior art.

SUMMARY OF THE INVENTION

Described briefly in a typical embodiment of the present invention, a switch mount is resiliently connected to the seat structure in such manner that a switch secured to the mount will be supported with sufficient firmness to be operated by seat structure mounted by the seat springs or by a portion of the springs themselves, and yet not so firmly that the seat padding will be bulged and thus disturb the normal contour of the seat cushion top or be felt by the seat occupant sitting in the seat. The mount is adjustable so that the switch will be actuated upon loading of the seat above a certain amount, so that, although the switch will not necessarily be operated by the weight of a package placed on the seat, it will be operated upon application of the weight of an individual person, assuming that such packages are lighter than such individual. Packages heavier than the minimum passenger weight selected for actuation, would normally be placed on the floor or in the luggage compartment.

DESCRIPTION OF THE PREFERRED EMBODIMENTS

In U.S. Pat. No. 3,371,736 issued Mar. 5, 1968 to me and Gene Richard Jack, a switch mounted to a seat belt retracter assembly is in circuit with the engine cranking motor relay. If the belt is retracted, the cranking motor cannot be energized because the switch is open. If the belt is pulled out, as for securing it around the driver or a passenger, the switch is closed and the engine can be cranked by the starting motor in normal fashion. It often happens that passengers will not secure their seat belts and the driver may forget to secure his, and it is desirable to be aware of it if at any time, the driver or a passenger is not using his seat belt.

Figure 1:
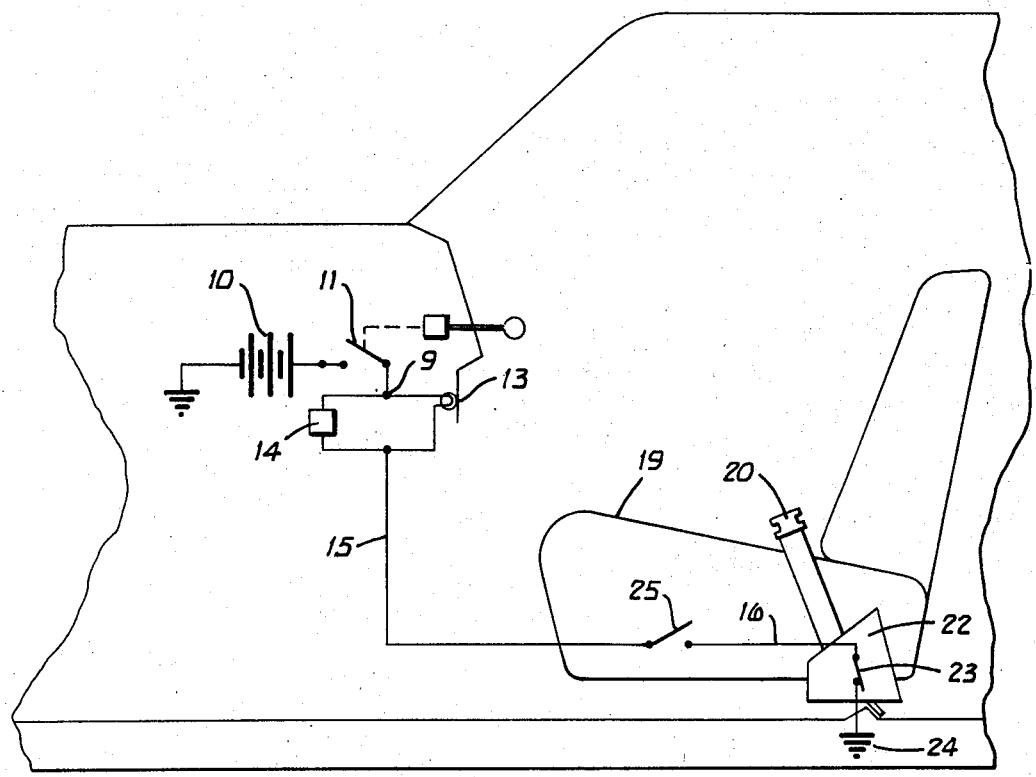
FIG. 1 is a schematic view of a portion of a vehicle with a seat belt warning system employed therein.
Figure 2:
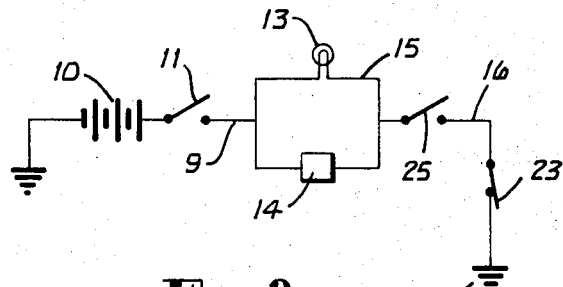
FIG. 2 is an enlarged elevation of a type of combination belt retractor and switch mount.
Figure 3:
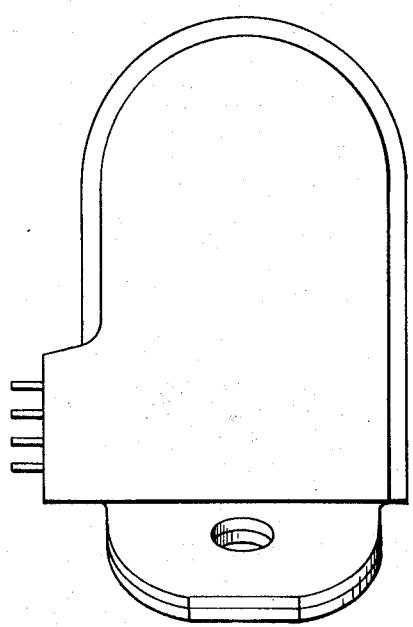
FIG. 3 is a schematic diagram of the circuit apart from the particular vehicle environment.

While the above mentioned patent employs a switch which is normally open when the seat belt is retracted, my present invention adds a second switch to the assembly of the above patent, operable in the same way, but having contacts 23 (FIGS. 1 and 3 herein) which are normally closed when the belt is retracted. Both switches can be in the same housing and operated by a single lever arm if so desired. A third switch 25 is mounted in the seat assembly and is normally open until it is closed by the weight of a person sitting down on the seat. A warning light 13 and buzzer 14 are connected in parallel. This parallel combination of warning light and buzzer are in series with the normally closed switch 23 associated with the retracter, and the normally open switch 25 associated with the seat, and with an ignition key controlled switch 11. Therefore, whenever the ignition key is turned on, a person is sitting in the seat, and the seat belt is retracted, a circuit is closed through the warning lamp and buzzer, thus indicating that the seat belt is retracted. When the seat belt is pulled out, for securing it around the passenger, the normally closed switch 23 associated with the retracter is open and the warning lamp and buzzer cease to operate.

A seat load responsive switch can be provided for each passenger location and associated with the respective seat belt retracter-operated switch for that location, as well as a warning light and buzzer for each such location, if desired. One warning light and buzzer for all occupants can be employed, if desired.

The passenger weight responsive switch should be mounted so as to avoid any discomfort to the passenger, and yet respond reliably to the weight of the passenger received on the seat, and remain immune to seat adjustments such as can be effected by six-way power seat controls, for example.

The attached drawings show various arrangements of seat mounted switches. It should be understood, of course, that my present invention can be employed with retracter operated or belt position responsive switches other than the arrangement shown in the above mentioned patent.

For each seat switch, two brackets 30 (FIG. 4) are secured to the underside of the seat spring wire mount 29, one at the front of the seat and one at the rear. Eye bolts 33 are mounted on bracket 30 at the rear and are received through holes in a resilient (usually steel) strip 27 having a tongue at its front end received between rod 29 and the loop of the front bracket 30. Switch assembly 25 is mounted in strip 27 with the button thereof projecting up toward actuator plate 28 mounted to the bottom of the seat spring wire 34.

When the seat spring is depressed at the central portion, by the weight of a passenger, plate 28 is pushed against the button, to close the switch. The member 27, due to its own flexibility and resilience of springs 36 supporting it, can comply with the seat spring and padding movement and descend enough to avoid causing a lump in the seat.

Figure 4:
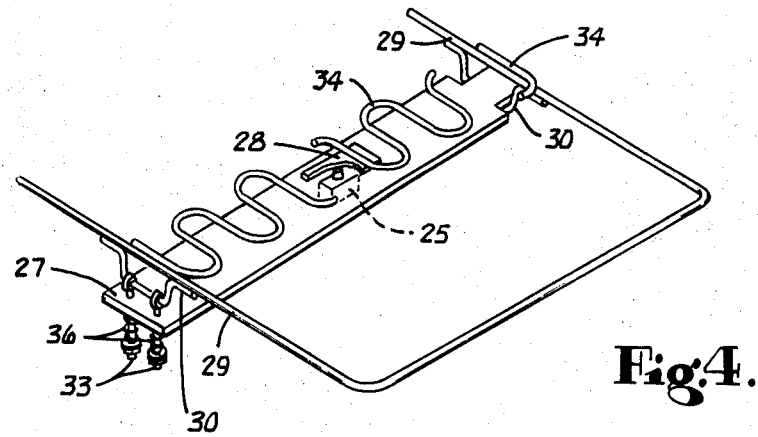
FIG. 4 is a perspective view of a portion of a seat spring structure employing one embodiment of the occupant-actuated switch assembly and mount therefor.
Figure 5:
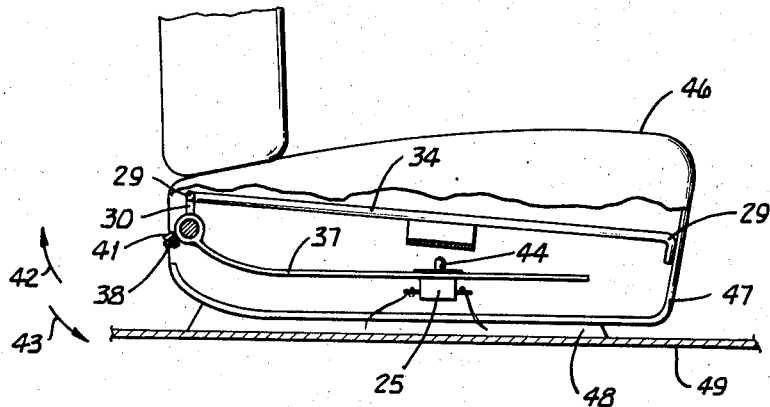
FIG. 5 is an enlarged fragmentary elevational view and section of a portion of a seat employing another embodiment of a switch and mount assembly.

An alternate embodiment is shown in FIG. 5, where spring steel member 37 is cantilevered from a clamp 38 at the rear, thus avoiding the need for a bracket 30 at the front of the seat. The bracket 30 at the rear of the seat may be located just as it is in FIG. 4, one of them being located at the rear of each position on the seat where an occupant is likely to sit. By loosening the nut 41 on the clamp 38, the member 37 can be moved in the direction of arrow 42 or 43 about the bracket 30 to increase or decrease, respectively, the amount of seat load required to activate the switch 25. That is, by rotating the clamp slightly in the direction of arrow 43, it will take less load on the seat to operate the push button 44 downwardly and thereby operate the switch.

In the particular embodiment illustrated in FIG. 5, the seat spring wire 34 may be of the same configuration as shown in FIG. 4, a series of such arrangements being provided along the width of the seat. The padding 39 is disposed on top of this, followed by suitable covering to provide the finished seat top 46 and complete the seat cushion. The whole assembly is mounted on a frame 47 which is mounted on tracks secured to the vehicle floor 49. It should be recognized that the present invention can be employed with a variety of seat structures including those incorporating coil springs, with the upper portions of such springs being secured to a grid or other arrangements supporting the seat padding. Also the seats can be fixed in the vehicle or can be somewhat universally mounted as for the "six-away" power adjusted seat assembly.

Figure 6:
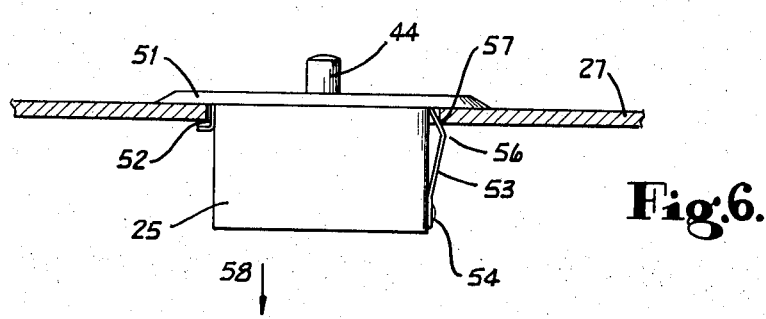
FIG. 6 is a further enlarged section through a switch mounting and showing the fastening of the switch therein.

In FIG. 6, it is shown that the switch button assembly 25 has a face plate 51 abuttingly received on the top of the strip 27. The same arrangement is provided on the strip 37 of FIG. 5. A rectangular aperture is provided at 52 which receives the switch contact housing therethrough and a spring clip 53 secured to the housing at 54 has a crown at 56 which snaps under the edge of the strip 27 and 57 as the switch is mounted in the strip in the direction of arrow 58 to securely retain the switch therein.

While the invention has been disclosed and described in some detail in the drawings and foregoing description, they are to be considered as illustrative and not restrictive in character, as other modifications may readily suggest themselves to persons skilled in this art and within the broad scope of the invention.

The invention claimed is:

1. Seat load responsive switching apparatus comprising:

seat frame means;
spring means in said frame means and supporting seat padding on said frame means;
switch means;
switch mount means on said frame means and supporting said switch means below said padding;
said switch means being operable upon predetermined movement of a portion of said spring means downward;
said switch mount means being resiliently mounted to said frame means for compliance with movement of said spring means portion downward after said switch means are operated, to minimize the possibility of a bulge in said padding by said switch means,
said mount means including first and second brackets secured to said seat frame means on opposite sides of a space below a location designated for a seat occupant, and a flexible resilient strip is mounted to said brackets and spans said space, said switch means being secured to said strip;
said mount means further including first and second hanger screws mounted to said first bracket and projecting downward therefrom through one end portion of said strip, and
first and second coil springs encircling respectively said first and second screws and resiliently supporting said one end portion; and
retainer means on said screws and supporting said springs from the bottom.

2. The apparatus of claim 1 wherein said retainer means are adjustable to predetermine the seat occupant force required to operate said switch means.

3. The apparatus of claim 1 wherein:
the other end portion of said strip projects horizontally through a loop in said second bracket and is horizontally slidable therein to accommodate vertical deflection of said strip.

4. The apparatus of claim 3 and further comprising:
a first actuator member secured to said spring means above said switch means;
a second actuator member on said switch means and engageable by said first actuator member as said padding is moved downward toward said switch means by the weight of a seat occupant.

5. Seat load responsive switching apparatus comprising:
seat frame means;
spring means in said frame means and supporting seat padding on said frame means;
switch means;
switch mount means adjustably mounted on said frame means and supporting said switch means below said padding, the adjustable mounting being adjacent a side of space below a location designated for a seat occupant;
said switch means being operable upon predetermined movement of a portion of said spring means downward;
said switch mount means being resiliently mounted to said frame means for compliance with movement of said spring means portion downward after said switch means are operated, to minimize the possibility of a bulge in said padding by said switch means;

said mount means including a resilient strip cantilevered from said seat frame means at the front side or rear side of said space, said switch means being secured to said strip at a point remote from the point of attachment of said strip to said seat frame means whereby said switch means is swingable about the said point of attachment by depression of the seat above said switch means after operation of said switch means by depression of said seat, said seat frame means including a seat spring wire mounting rod extending along front, rear, and lateral sides of the seat, said mount means further including an adjustable clamp adjacent said rod at one of said front and rear sides and securing said strip to said seat frame means at said point of attachment, said clamp means being adjustable on said seat frame means to predetermine the downward force required for a seat occupant above said switch means to operate said switch means.

* * * * *